United States Patent Office 3,497,736
Patented Feb. 24, 1970

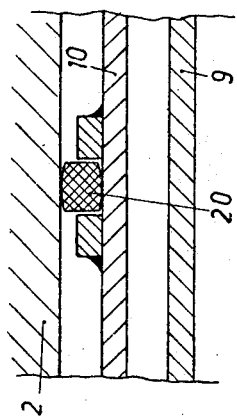
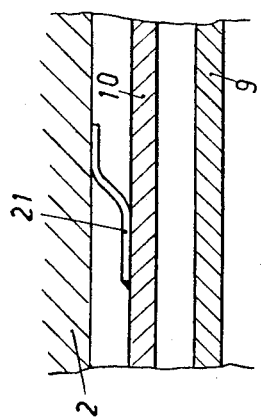
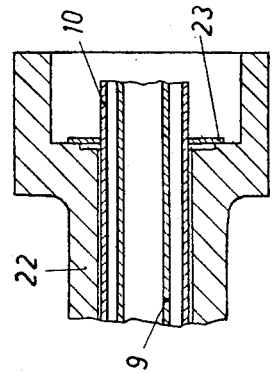
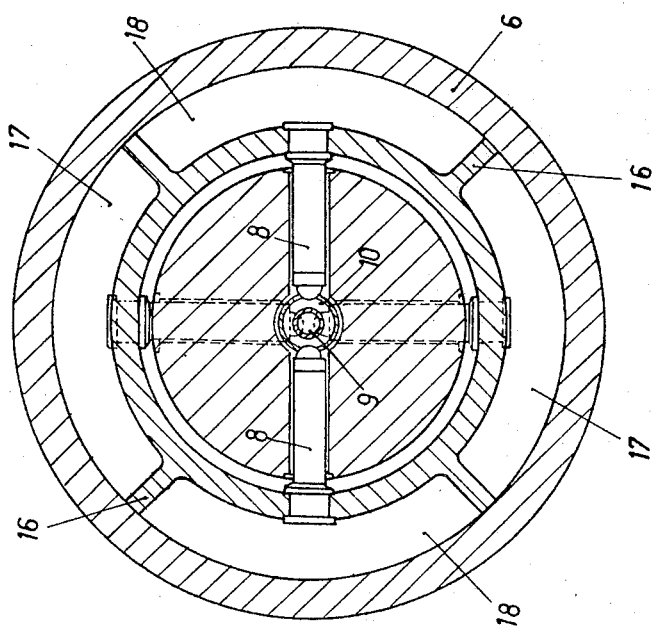

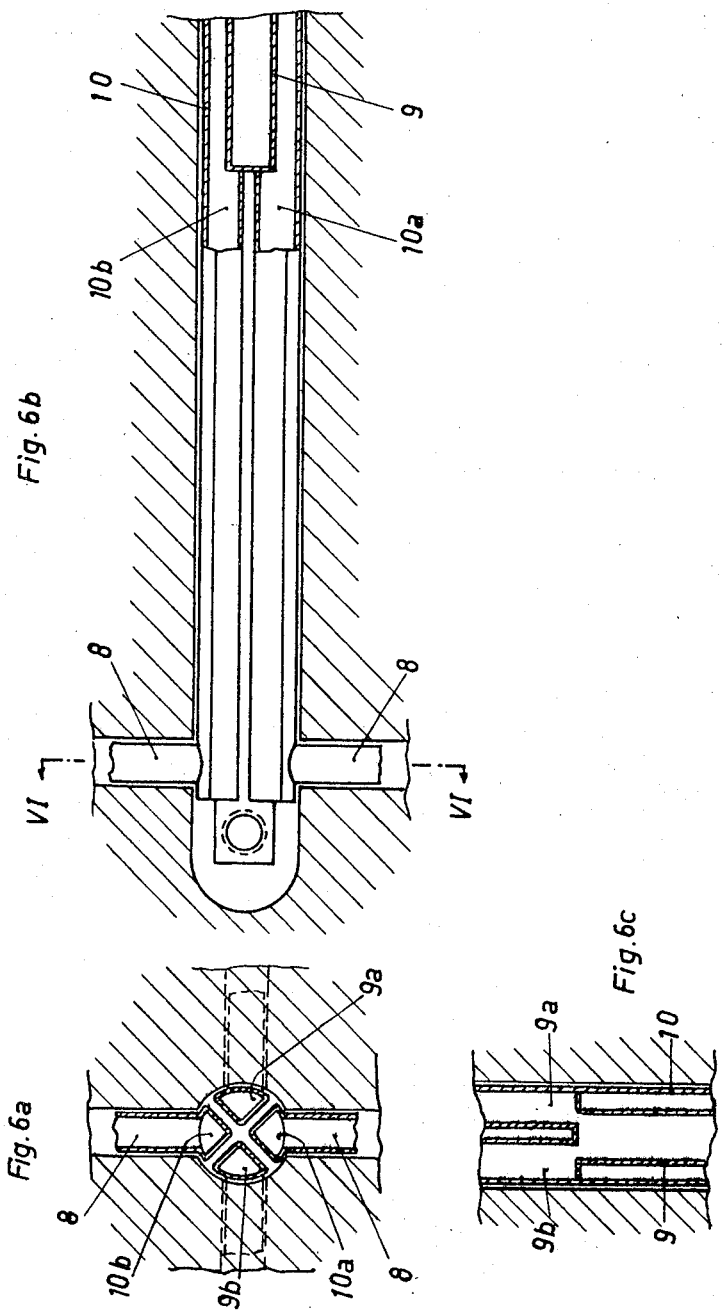

3,497,736
TURBOGENERATOR WITH DIRECTLY LIQUID-COOLING ROTOR WINDING
Robert Cuny, Wettingen, and Rolf-Dieter Kranz, Baden, Switzerland, assignors to Brown Boveri & Cie, Baden, Switzerland, a joint-stock company
Filed Oct. 5, 1967, Ser. No. 673,161
Claims priority, application Switzerland, Oct. 14, 1966, 14,887/66
Int. Cl. H02k 9/19
U.S. Cl. 310—54                                                    9 Claims

ABSTRACT OF THE DISCLOSURE

A liquid cooled rotor structure for a tourbogenerator includes a hollow conductor type winding through which a liquid coolant is circulated. The end turn portion of the winding is protected by a flying end cap, and liquid coolant is conducted to and away from the end turns by a rigid pipe system which includes radial pipes located within radial bores in the rotor shaft which connect with axial pipes located within axial bores in the rotor shaft. The radial and axial pipes are spaced from the walls of the bores, and the axial pipes which extend beyond the end of the rotor are supported by a bearing assembly in such manner as to permit axial expansion and contraction of the pipe relative to the bearing.

---

Figure 1:
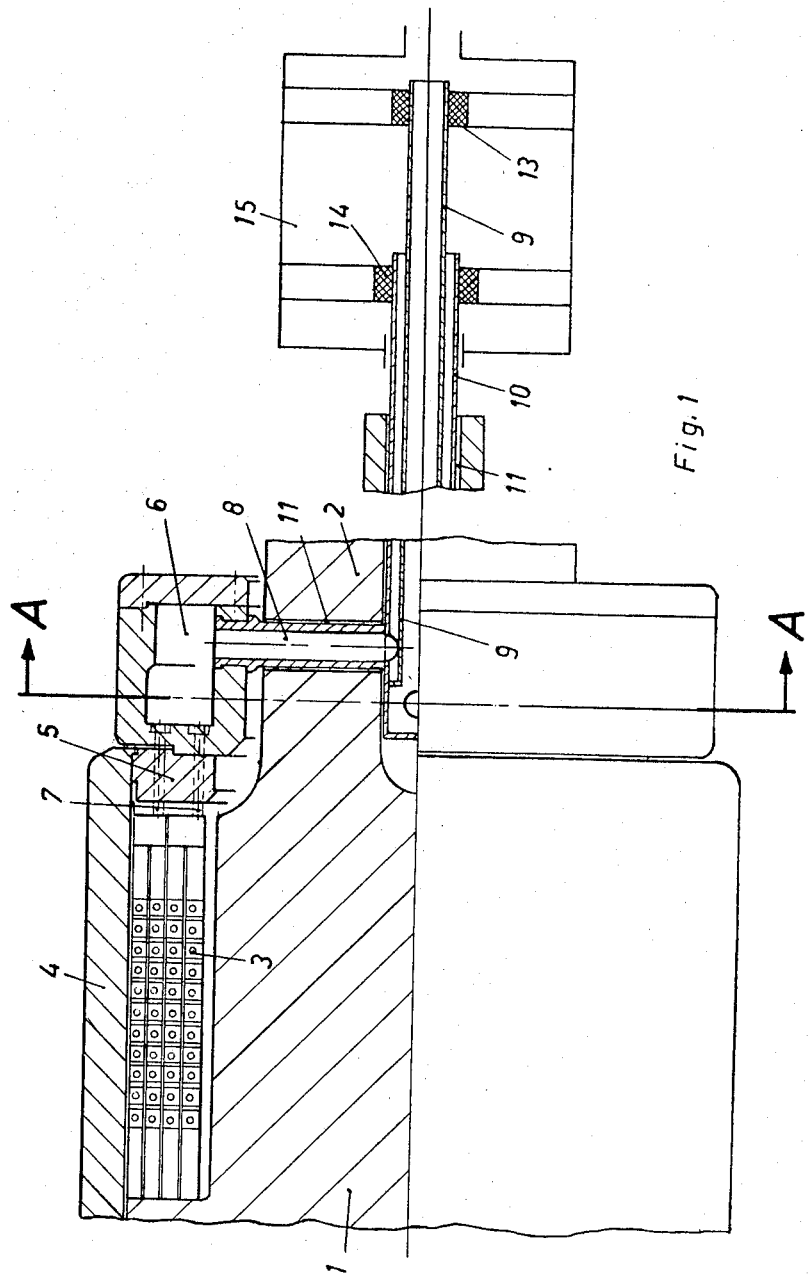

The invention concerns turbogenerators in which the rotor winding is cooled directly with a liquid, for example water, the winding consisting either of hollow conductors or cooling conduits are located in the winding.

With turbogenerators of this kind it is usual to supply and discharge the cooling liquid at the shaft end of the rotor and to conduct it as far as possible inside the rotor shaft near to the supply point of the winding which consists for instance of hollow conductors. For this purpose axial channels are provided within the rotor shaft, these being in communication by way of radial bores with external distribution chambers which are connected to the hollow conductors of the end turns of the rotor winding. The end turns of the winding are held in position against the effect of the centrifugal force by means of a retaining ring in the form of a cylinder and known as a flying cap which at one end is shrunk on to the rotor body and at the other end to an annular end plate, the inner periphery of this plate being radially spaced from the rotor body.

In these known machines, relative movements thus occur between the rotor shaft and the end turns of the winding and these are due to oscillations resulting from a bending of the shaft and also due to thermal expansions and centrifugal forces.

As a consequence, it is necessary in such machines where the cooling liquid is supplied from the rotor shaft to the winding end turns that measures be adopted to deal with these relative movements and oscillations, otherwise the cooling system is endagered. At the same time it is necessary to take into account that the pressure of the cooling liquid increases with the square of the radial distance from the axis of the shaft. Thus the flexible radial pipe connections, for instance pipe compensators, used hitherto for this purpose, can no longer be made sufficiently flexible so as to withstand the obcillations, which have a frequency corresponding to the speed of the machine, without breakages occurring due to fatique.

The invention thus refers to a turbogenerator with a rotor winding which is directly cooled by a liquid that is supplied to and discharged from the cooling channels of the winding by way of radial and axial pipes which are arranged in radial and axial bores respectively in the rotor shft, whereby the problem of aforementioned relative movements is solved in accordance with the invention in that a clearance is provided between the radial and axial pipes and the corresponding bores in the rotor shaft. In this way relative movements between the pipes or conduits and the rotor shaft can occur without the cooling system being endangered.

Constructional examples of the arrangement according to the invenion are now explained with reference to the drawing where FIG. 1 shows one end of the rotor of a turbogenerator partly in longitudinal section, whilst FIG. 2 is a cross-sectional view of the rotor end taken along the line A—A of FIG. 1.

FIGS. 3 to 5 show in longitudinal section to an enlarged scale various damping devices for the axial pipes of the cooling system.

In FIG. 6 a modified constructional form of the invention is illustrated in a cross-sectional view.

In FIG. 1 reference numeral 1 indicates the rotor and 2 the rotor shaft of a turbogenerator, while the end turns of the liquid cooled rotor winding consist of hollow conductors 3. These end turns 3 are held in position by a rotor cap which comprises a retaining ring 4 which on the one hand is shrunk at one end on to the rotor body and on the other hand rigidly connected at the other end to an annular end plate 5 by a shrink fit. Between the bore i.e. the inner diameter of the annular end plate 5 and the rotor shaft 2 there is a clearance.

An annular distribution chamber 6 for the cooling liquid is arranged on the outside of the end plate 5, this chamber being connected by means of pipes 7 to the hollow conductors of the winding end turns 3. At the same time, the distribution chamber 6 is rigidly connected by way of radial pipes 8 in radial bores 2a, 2b to axial conduits 9 and 10 located inside the shaft bore. Between the radial pipes 8 and the corresponding radial bores in the rotor shaft 2 and also between the axial bore 2a, 2b in the shaft and the coaxial conduits 9, 10 a clearance 11 is provided which enables relative movements to occur between the various pipes and conduits and the rotor shaft. Coaxial conduits 9, 10 project beyond the end of the shaft and are supported in one or more bearings of a bearing assembly 15 in such a manner that they are moveable in the axial direction. These bearings can expediently be integral parts of the glands 13, 14 of a cooling liquid transfer device, in which case they are lubricated by the cooling liquid.

With the constructional example of the invention shown in FIGS. 1 and 2, the cooling liquid is supplied and discharged at the same shaft end and for this purpose the annular distribution chamber 6 is divided in the circumferential direction by radial separating walls 16 into four subchambers (FIG. 2). Diametrically opposite subchambers 17 are each in communication by way of a pipe 8 with a common axial supply conduit 9 and the other two diametrically opposite subchambers 18 are each connected by a radial pipe 8 to the discharge conduit 10 inside the shaft bore. The radial pipes 8 for subchambers 17 are displaced in the axial direction with respect to those belonging to subchambers 18.

Axial conduits 9, 10 together with the radial pipes 8 associated with them are independent of the rotor shaft and are only supported at two points. One supporting point is where the radial pipe 8 is rigidly joined to the distribution chamber 6 and the other supporting point is formed by the bearings 13 and 14 which allow the conduit to move freely in the axial direction. Since there is always a clearance between the pipes and the shaft bores, oscillations of the pipes relative to the rotor shaft are always possible. Furthermore, the pipe system described can always follow any axial expansions of the rotor cap 4, 5 and distribution chamber 6 which may occur during the operation of the machine.

For the purpose of absorbing the difference in expansion produced in the distribution chamber 6 and the radial pipes 8 due to the effect of the centrifugal force acting on these parts, the radial pipes 8 can be prestressed when they are mounted in the distribution chamber 6.

An alternative measure is to divide the axial conduits 9, 10 at their inner end along a certain length so that several axial part conduits are formed which are each connected to a radial pipe 8. An example of such a construction is shown in FIGS. 6a and 6b in cross-section and longitudinal section respectively where the axial conduits 9 and 10 are each divided into two conduits 9a, 9b and 10a, 10b respectively along part of their length. These part conduits resulting from a division of the concentric conduits 9 and 10 are each connected to a radial pipe 8 in communication with a common distribution chamber 6 and have sufficient flexibility to withstand the effect of the centrifugal force acting on the distribution chamber.

It is to be noted that generally the rotor shaft is relatively long due to the space occupied by the current transmission equipment required for the generator, so that axial conduits 9 and 10 have a considerable sag or have to be made with very thick walls in order to prevent them from bending. It is therefore expedient to retain the inherent flexibility of the axial conducts and to provide them with an additional support or bearing which acts as a damping or centering device. For this purpose it is generally sufficient if such a damping device is provided only between the outer conduit 10 and the shaft bore. This damping device must be located a sufficient distance away from the point where the axial conduit 10 is joined to the radial pipe 8 in order to retain the desired flexibility for the cooling pipe system. The damping device can for example consist of a rubber ring 20 as shown in FIG. 3 or leaf springs 21 which act in the radial direction as shown in FIG. 4.

When the shaft end on which the current transmission equipment is located is connected to the rotor shaft by a flange coupling, it is possible to achieve a centering or damping effect by means of leaf springs 23 located inside the coupling 22 as shown in FIG. 5, where the springs act in the axial direction. With this arrangement springs 23 do not prevent an angular movement of the conduit 10 with respect to the shaft 2 so that the axis of the conduit can have an inclination with regard to that of the shaft bore, and at the same time free movement of the conduit in the axial direction due to thermal expansion is also possible.

Although the invention has been explained with reference to a constructional example where the cooling liquid is supplied and discharged at the same end of the rotor, it is possible to apply the invention in an analogous manner to turbogenerators where the supply chamber for the cooling liquid is located on the end plate of one rotor cap and the discharge chamber on the end plate of the other rotor cap. In this case it is not necessary to divide the distribution chambers as shown in FIG. 2.

What we claim is:
1. In a liquid-cooled rotor structure for a turbo-generator the combination comprising a cylindrical rotor body having a liquid cooled winding thereon including hollow end turns located at one end of the rotor body, a cylindrical retaining ring surrounding said end turns, one end of said ring being secured to the rotor body and the other end terminating in an annular end plate secured thereto and which at its inner periphery is spaced from the surface of the rotor body, means providing an axial bore in the rotor shaft extending inwardly from the end thereof, means providing at least one radial bore in said rotor shaft leading inwardly from the surface thereof to and communicating with said axial bore, a rigid radial pipe located within said radial bore and spaced from the wall thereof, rigid means connecting the outer end of said radial pipe with the hollow end turn portion of said winding, at least one rigid axial pipe located within said axial bore and spaced from the wall thereof, the inner end portion of said axial pipe being rigidly connected to the inner end of said radial pipe and the outer end of said axial pipe extending outwardly from the end of said rotor shaft, and bearing means supporting the outer end of said axial pipe such as to permit movement thereof in an axial direction in response to thermal expansion and contraction, said radial and axial pipes serving to convey the liquid coolant to said end turns of said winding.

2. A liquid cooled rotor structure as defined in claim 1 wherein said radial pipe is prestressed.

3. A liquid cooled rotor structure as defined in claim 1 and wherein two concentric and radially spaced axial pipes are provided within and spaced from the axial bore of said shaft and at least two radial pipes are provided in radial bores in said shaft and are connected respectively to said concentric axial pipes for respectively supplying liquid coolant to and discharging liquid coolant from said end turns.

4. A liquid cooled rotor structure as defined in claim 1 wherein said means connecting the outer end of said radial pipe with the hollow end turn portion of said winding includes a distribution chamber through which the liquid coolant flows, said distribution chamber being secured to said annular end plate.

5. A liquid cooled rotor structure as defined in claim 1 wherein said axial pipe is divided at its inner end portion along at least a certain axial length so as to form a plurality of axial part pipes each of which is rigidly connected to at least one radial pipe.

6. A liquid cooled rotor structure as defined in claim 1 wherein said bearing means form an integral part of the glands of a liquid coolant transfer device.

7. A liquid cooled rotor structure as defined in claim 1 and which further includes damping means located intermediate between and in contact with said axial pipe and the bore of said rotor shaft.

8. A liquid cooled rotor structure as defined in claim 7 wherein said damping means is constituted by a leaf spring.

9. A liquid cooled rotor structure as defined in claim 7 wherein said damping means is constituted by a rubber ring.

References Cited

UNITED STATES PATENTS

| 3,034,003 | 5/1962 | Seidner | 310—61 |
| 3,131,321 | 4/1964 | Gibbs | 310—54 |
| 3,243,616 | 3/1966 | Tudge | 310—54 |
| 3,267,868 | 10/1966 | Page | 310—54 |
| 3,320,447 | 5/1967 | Banchieri | 310—54 |
| 3,393,333 | 7/1968 | Kudlacik | 310—61 |

MILTON O. HIRSHFIELD, Primary Examiner

R. SKUDY, Assistant Examiner

U.S. Cl. X.R.

310—65